Jan. 31, 1939.  V. JERECZEK  2,145,355
MILLING MACHINE
Filed July 16, 1937  2 Sheets-Sheet 1
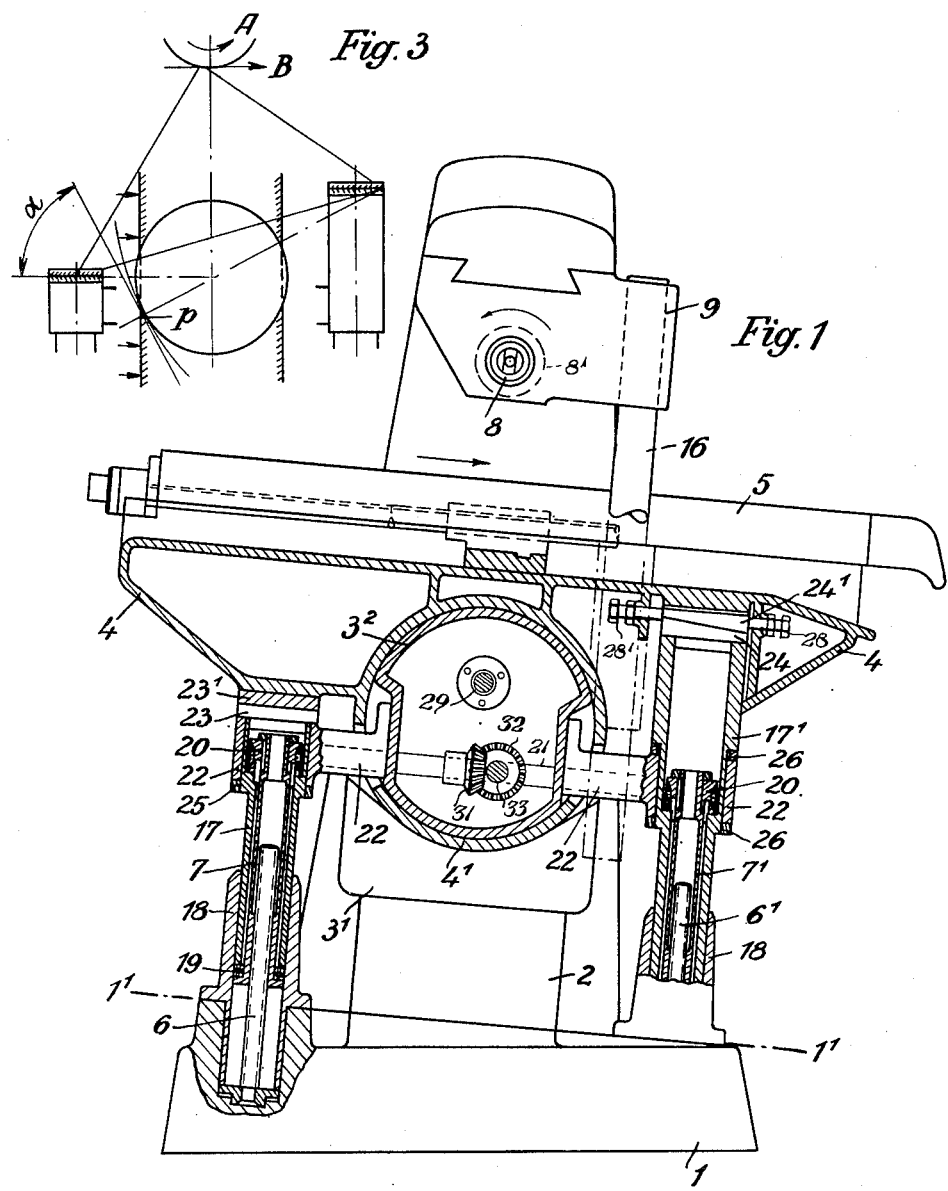

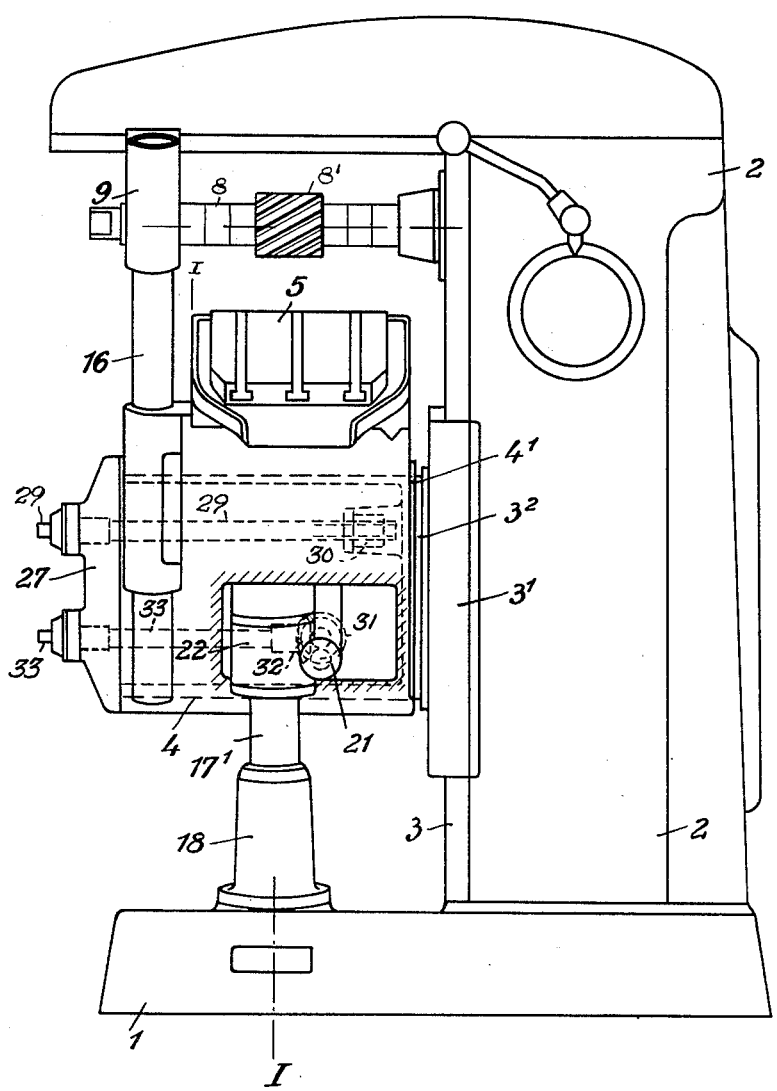

UNITED STATES PATENT OFFICE 2,145,355

MILLING MACHINE

Viktor Jereczek, Weissensee, near Berlin, Germany

Application July 16, 1937, Serial No. 154,088
In Germany December 6, 1935

10 Claims. (Cl. 90—58)

My invention relates to a milling machine suited especially for equidirectional milling, that is to say, milling in the direction of feed of the work-piece. In essence, the invention consists therein that two or more spindles, for instance threaded spindles, arranged in a plane parallel to the direction of the table movement and effecting the adjustment in height of the table, support this latter which is movable on a horizontal axis.

With drilling and milling machines it is known to effect the adjustment in height by two threaded spindles, but with this known arrangement the threaded spindles are arranged in the axial direction of the tool spindle, and they do not serve, therefore, for supporting the milling table in its longitudinal direction. It is, however, the object of the present invention to take up the forces acting vertically upon the bed, or upon the table respectively, by means of the supporting spindles and to transmit said forces thereby to the base frame so that a secure support of the table is obtained even if this latter should be moved outwardly in a large extent. By reason of the table being now turnable on a horizontal axis a stressing-proof adjustment of the milling table is aimed at and attained.

It is known to increase the rigidity of a milling machine by means of two or more standards provided in the direction of feed of the work-piece. With these known arrangements, however, only the knee is being supported whereas the cross-bed carrying the longitudinally shiftable table and having to take up the forces originating from the cutting pressure is shiftable on a comparatively narrow prismatic guide member and is not supported in any manner, so that it is not possible to prevent considerable vibrations of the cross-bed and the table.

A further object of my invention is to support the cross-bed on the threaded spindles in such a manner that it is adjustable on a horizontal circular or cylindrical guide member transversely to the longitudinal movement of the table. The arrangement may be carried out in this way that said horizontal circular or cylindrical guide member, which is vertically guided on the machine frame, is carried by the cross-bed and moved along with the same when it is adjusted in height. Owing to the provision of the circular or cylindrical guide member the transversal forces arising in planes perpendicularly to the axis of the milling cutter are taken up by the said guide member.

It is known with milling machines to support the cross-bed, or the milling table respectively, on a circular or cylindrical guide member guided in turn vertically on the machine frame. The object of that known arrangement is, however, solely to render it possible to turn said table in a vertical plane on said guide member after certain clamping screws or equivalent members have been loosened, and to fix the table anew in its new position. A distortion-free adjustment in height and the taking up of transversal forces by means of the circular or cylindrical guide member cannot, however, be attained with the known arrangement mentioned.

The improved arrangement presented in my invention is attained, with the aid of the circular or cylindrical guide member and by means of the particular configuration of the cross-bed as forming part of the improved arrangement a stiffening of the bed body. In order to attain a further stiffening of the machine, it is possible, likewise according to this invention, to support the bearing of the milling cutter mandrel by means of a supporting column or the like extending through the cross-bed.

In order to obtain in equidirectional milling a quick removal of the amply produced chips by means of a current of a cooling fluid, the arrangement may be such that the table carrying the work-piece is guided on a path downwardly inclined in the working direction of the milling cutter. According to this invention, the cross-bed carrying the table is, for said purpose, supported on two members standing parallel with respect to the guides on the standard of the machine and being so arranged as to form an angle with a vertical line, that one of said two supporting members which is located at the lower side of the table being longer than the other supporting member in order to make the cross-bed contact without back-lash with the circular or cylindrical guide member by means of the forces due to the pressure resulting from the milling operation. The final effect of said arrangement and combination of the parts mentioned is that the weight of the cross-bed and of the table, combined with the additional pressure due to the milling operation, produce such a mutual stressing of the cross-bed and the knee that any back-lash arising, perhaps, between these two members cannot entail any detrimental action.

Another useful effect obtained by the inclined position of the table is that a component of the weight of the table with the work-piece thereon acts in the feeding direction of the table whereby moving the table in this direction is facilitated.

The invention is illustrated diagrammatically and by way of example on the accompanying drawings which show a milling machine equipped with a milling table movable on an inclined plane. On the drawings, Figure 1 is partly a front view of this machine and partly a vertical transverse section in the plane I—I of Fig. 2. Figure 2 is a side-view of the machine, and Figure 3 is a plan of the active forces, all as fully described hereinafter.

The entire machine stands perpendicularly with respect to an inclined plane 1¹ constituting the top surface of a hollow foot 1 serving, besides as a base for the machine, also as a receptacle for a cooling fluid. The upright or standard 2 of the machine has at its front face a straight-way guidance 3 for a vertically reciprocable plate 3¹ to which is attached a substantially cylindrical knee 3² which is the cylindrical guide member repeatedly mentioned in the introductory part to this specification. On said knee 3² is shiftable the cross-bed 4 with its hollow cylindrical middle portion 4¹, and on said bed 4 is arranged the milling table 5 which can be reciprocated thereon and carries the work-piece. The cross bed 4 may be shifted on the cylindrical knee 3² by means of a screw spindle 29, which for instance can be turned manually from outside and which engages a nut 30 fixed on the plate 3¹.

In the shiftable counter-arm 9 and in the upright 2 is supported in known manner the milling spindle 8 carrying the milling cutter 8¹. The counter-arm and the cross-bed are connected with one another by a vertical column 16 for stiffening the machine. The cross-bed 4 rests upon two guide columns 17 and 17¹ guided in fixed sleeves 18 and supported on tubular nuts 7 and 7¹ by the intermediary of ball bearings 19. Said nuts can be screwed along the threaded spindles 6 and 6¹ fixed in the base 1. At the upper end of each of the tubular nuts is a worm-wheel 20 which can be turned by means of a common worm shaft 21 either manually or mechanically in order to lift or to lower the cross-bed 4 together with the knee 3². For this purpose a bevel gear wheel 31 is connected to the shaft 21 and engages a second bevel gear wheel 32 fixed to a shaft 33. The latter, for instance, can be turned manually from outside. The hollow columns 17 and 17¹ in which are housed said worm-wheels 20 are encompassed by arms 22 secured to the knee 3² and extending through the hollow cylindrical body 4¹ of the cross-bed.

The cross-bed 4 is supported on the columns 17 and 17¹ by intermediate plates in the following manner: On the column 17 is provided a plate 23 on which rests a plate 23¹ affixed to the cross bed 4. The bearing surfaces of both said plates lie parallel to the plane of the table. To the column 17¹ is secured a plate 24 on which rests a plate 24¹ shiftably attached to the cross-bed 4. The bearing surfaces of these two plates are located obliquely with respect to the plane of the table, in such a manner, that the inclination of said surfaces is greater than the inclination of the table. Differences perhaps existing in the adjustment can be compensated by shifting the wedge-shaped plate 24¹ located upon the correspondingly shaped plate 24 by means of the adjusting screws 28, 28¹.

Adjusting the cross-bed 4 together with the table 5 transversely upon the cylindrical guide member 3² can be effected by means of any desired gearing (not shown).

The central portion of the cross-bed 4 formed by the hollow body 4¹ is closed at its front by a cover 27, whereby chips and cooling fluid are prevented from finding access to said portion.

The advantages obtainable by the arrangement and combinations of the members concerned, as described, appear from Fig. 3 in which the two supporting columns, the vertical guide member and the circular guide member are represented diagrammatically. The milling tool operates in the direction indicated by the arrow A and the feed of the table takes place in the same direction, as indicated by the arrow B. The forces resulting from the cutting action of the milling tool and the resistance to be overcome by the same are transmitted to the two supporting columns by means of the cross-bed, the column 17¹ being that which has to take up the greatest proportion of the force. The triangle drawn over the supporting columns in Fig. 3 shows that a very favorable support of the cross-bed for taking up the arising forces is attained by the employment of the longer supporting column.

The transversal forces are taken up by means of the cylindrical guide member which is able to take up forces of various kinds appearing in a projection plane lying perpendicularly with respect to the axis of the milling cutter.

Supposing, there is some back-lash between the knee and the cross-bed, and as the arising forces try to lift the cross-bed off from the left-hand support, in which case, as regards the arrangement described, the extreme right-hand edge of the wedge-shaped supporting plate 24 is to be considered as a fulcrum, the following will be observed: A straight line starting from the fulcrum and being drawn through the centre of the cylindrical guide member will intersect the circle in the point $p$. A tangent forms with the horizontal line an angle $\alpha$ which is smaller than 90°. The lifting force cannot, therefore, become active. In view of the oblique position of the entire system, as shown in Fig. 1, the cylindrical bore of the cross bed will contact with the knee at the place $p$. When this has taken place, the cross-bed will bear stronger upon the guide surfaces of the supporting plates 23, 24 of the two columns 17, 17¹ by its weight, as well as by the action of the cutting forces to which it is subjected. This action is assisted and the effect increased by the oblique position of the contacting faces of the plates 24 and 24¹. The more the table of the cross-bed is loaded, the more intimate will be the contact between the knee and the cross-bed, and the less will it be possible to turn the cross-bed or to lift it off the left-hand supporting column 17. There is, thus, obtained by the arising forces a mutual stressing between the cross-bed and the knee.

Owing to the employment of the circular or cylindrical guide member the horizontal pressure produced by the milling tool cannot cause any distortion of the vertical prismatic guide, in that the circular or cylindrical portion of said first-mentioned guide distributes said pressure uniformly around, and transmits it to the standard or upright of the machine.

The arrangement as shown and described renders also possible to re-adjust the supporting columns, which can be effected by means either of nuts 25 of the supporting column 17 or of nuts 26 of the supporting column 17¹.

I claim:

1. A milling machine, comprising in combination, with a cross bed and a table reciprocable on said cross bed, a plurality of spindles for supporting and vertically adjusting said cross bed, said spindles being arranged in a plane parallel to the direction of the table movement, a horizontally arranged circular guide for said cross bed, said cross bed loosely encircling said guide whereby it may be shifted on said circular guide transversely to the longitudinal movement of the table.

2. A milling machine, comprising in combination with a cross bed and a table reciprocable on said cross bed, two threaded spindles for supporting and vertically adjusting said cross bed, said threaded spindles being arranged in a plane parallel to the direction of the table movement, a horizontally arranged circular guide for said cross bed, said cross bed loosely encircling said guide whereby it may be shifted on said circular guide transversely to the longitudinal movement of the table.

3. A milling machine, comprising in combination with a machine frame, a cross bed and a table reciprocable on said cross bed, two threaded spindles for supporting and vertically adjusting said cross bed, said threaded spindles being arranged in a plane parallel to the direction of the table movement, a circular guide for said cross bed, said guide being horizontally arranged and vertically guided on the machine frame and taken along with said cross bed when an adjustment in height is effected.

4. A milling machine, comprising in combination with a cross bed and a table reciprocable on said cross bed, two adjustable supporting members for adjustably supporting said cross bed, said supporting members arranged in a plane parallel to the direction of the table movement, a horizontally arranged circular guide for said cross bed, said cross bed loosely encircling said guide whereby it may be shifted on said circular guide transversely to the longitudinal movement of said table, and sliding bodies inserted between said cross bed and said supporting members.

5. A milling machine, comprising in combination with a machine frame, a cross bed and a table reciprocable on said cross bed, means for guiding said cross bed in the machine frame, said guiding means arranged at an angle with respect to the perpendicular, two supporting members for supporting and vertically adjusting said cross bed, said supporting members being disposed parallel with respect to said guiding means and guide-ways for said table lying at a right angle to said inclined supporting members.

6. A milling machine, comprising in combination with a machine frame, a cross bed and a table reciprocable on said cross bed, a horizontally arranged circular guide for said cross bed, said cross bed loosely encircling said circular axis whereby it may be shifted on said guide transversely to the longitudinal movement of the table, said circular guide being movable on guide-ways of the machine frame, said guide-ways arranged at an angle with respect to the perpendicular, two members for supporting and adjusting said cross bed in height, said two supporting members arranged in a plane parallel to the direction of the table movement and being disposed parallel with respect to said guide-ways, and guide-ways on said cross bed for said table and arranged at a right angle to the said inclined supporting members.

7. A milling machine, comprising in combination with a machine frame, a cross bed and a table reciprocable on said cross bed, a horizontally arranged circular guide for said cross bed, said cross bed being shiftable on said circular axis, said guide being movable on guide-ways of the machine frame, said guide-ways arranged at an angle with respect to the perpendicular, two members for supporting and adjusting said cross bed in height, said two supporting members arranged in a plane parallel to the direction of the table movement and disposed parallel with respect to said guide-ways, and guide-ways on said cross bed for said table and arranged at a right angle with respect to said inclined supporting members, the supporting member located at the lower side of the table being longer than the other supporting member.

8. A milling machine, comprising in combination with a machine frame, a cross bed and a table reciprocable on said cross bed, a horizontally arranged circular guide for said cross bed, the latter being shiftable on said circular guide, said guide being movable on guide-ways of the machine frame, said guide-ways arranged at an angle with respect to the perpendicular, two members for supporting and adjusting said cross bed in height, said two supporting members arranged in a plane parallel to the direction of the table movement and disposed parallel with respect to said guide-ways, and guide-ways on said cross bed for said table and arranged at a right angle with respect to said inclined supporting members, the supporting member located at the lower side of the table being longer than the other supporting member, and sliding bodies interposed between said cross bed and said two supporting members, the sliding bodies interposed between said longer supporting member and the cross bed having a greater inclination to the horizontal than the plane of the table.

9. A milling machine, comprising in combination with a cross bed and a table reciprocable on said cross bed, two threaded spindles fixed in the machine frame, a tubular nut turnable on each of said two threaded spindles respectively, and columns carried by said tubular nuts, said columns forming supports for said cross bed and adapted for vertically adjusting the same, said threaded spindles with said tubular nuts and columns arranged in a plane parallel to the direction of the table movement, a horizontally arranged circular guide for said cross bed, said cross bed being shiftable on said circular guide transversely to the longitudinal movement of the table, and two arms connected to said circular guide, each of said arms encompassing one of said columns, and means for turning said tubular nuts.

10. A milling machine, comprising in combination with a cross bed and a table reciprocable on said cross bed, two threaded spindles fixed in the machine frame, a tubular nut turnable on each of said two threaded spindles respectively, and columns carried by said tubular nuts, said columns forming supports for said cross bed and adapted for vertically adjusting the latter, said threaded spindles with said tubular nuts and columns arranged in a plane parallel to the direction of the table movement, a horizontally arranged circular guide for said cross bed, said cross bed being shiftable on said circular guide transversely to the longitudinal movement of the table, and two arms connected to said circular guide, each of said arms encompassing one of said columns, means for turning said tubular nuts, a bearing for the milling spindle of the machine, and a vertical column connecting said bearing with said cross bed.

VIKTOR JERECZEK.